United States Patent [19]

Negre

[11] Patent Number: 6,065,200
[45] Date of Patent: May 23, 2000

[54] METHOD FOR ASSEMBLING BODYWORK PARTS

[75] Inventor: Bernard Negre, Paris, France

[73] Assignee: ABB Preciflex Systems, Beauchamp, France

[*] Notice: This patent issued on a continued prosecution application filed under 37 CFR 1.53(d), and is subject to the twenty year patent term provisions of 35 U.S.C. 154(a)(2).

[21] Appl. No.: 08/637,629

[22] PCT Filed: Oct. 28, 1994

[86] PCT No.: PCT/FR94/01260

§ 371 Date: Apr. 29, 1998

§ 102(e) Date: Apr. 29, 1998

[87] PCT Pub. No.: WO95/12515

PCT Pub. Date: May 11, 1995

[30] Foreign Application Priority Data

Nov. 3, 1993 [FR] France ................................. 93 13062

[51] Int. Cl.[7] ............................. B23Q 17/00; B23K 11/00
[52] U.S. Cl. ............................... 29/430; 29/429; 29/464; 219/86.24; 228/6.1
[58] Field of Search ............................. 29/559, 429, 430, 29/464, 468, 281.1, 281.5, 799, 822, 824; 228/4.1, 6.1; 219/86.24

[56] References Cited

U.S. PATENT DOCUMENTS

| 4,295,262 | 10/1981 | Grote et al. | 29/559 |
| 4,316,072 | 2/1982 | Arnoldt | 219/86.24 |
| 4,667,866 | 5/1987 | Tobita . | |
| 4,869,416 | 9/1989 | Harada . | |
| 5,181,307 | 1/1993 | Kitahama et al. | 29/468 |
| 5,203,811 | 4/1993 | Hirotani et al. | 29/429 |
| 5,267,385 | 12/1993 | Ikeda et al. | 29/430 |
| 5,267,683 | 12/1993 | Hamada et al. | 29/430 |
| 5,397,047 | 3/1995 | Zampini | 228/6.1 |
| 5,479,698 | 1/1996 | Angel | 29/281.5 |

FOREIGN PATENT DOCUMENTS

| 0438989 | 7/1991 | European Pat. Off. . |
| 2185220 | 7/1987 | United Kingdom . |
| 2236285 | 4/1991 | United Kingdom . |
| 2260717 | 4/1993 | United Kingdom . |

*Primary Examiner*—William Briggs
*Attorney, Agent, or Firm*—Griffin, Butler, Whisenhunt & Szipl, LLP

[57] ABSTRACT

A method for assembling body parts wherein at least two originally separate elements are brought to an assembly station, where they are held stationary with respect to one another and with reference to the assembly station. Supports, uniquely adapted to handle a plurality of models of parts grip the elements and are used to bring the elements to the assembly station and are thereafter transported to further assembly stations for the addition of additional elements as appropriate. The elements are joined together, for example, by welding.

8 Claims, 5 Drawing Sheets

FIG_1

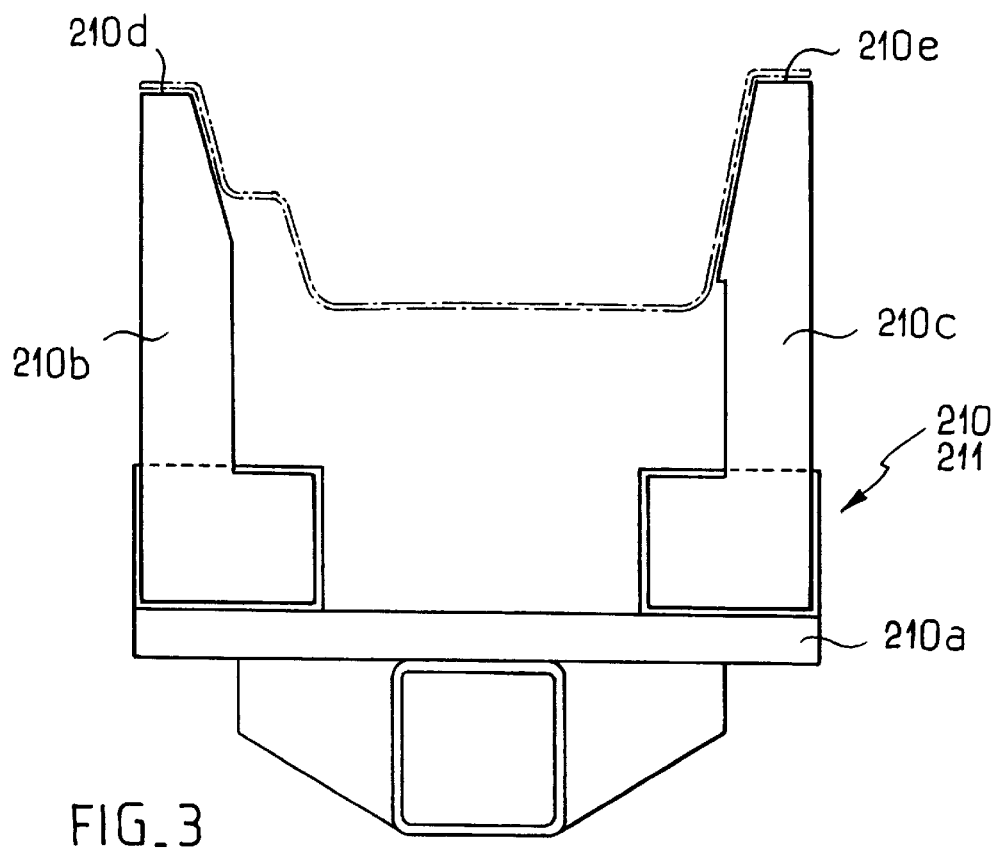
FIG._3
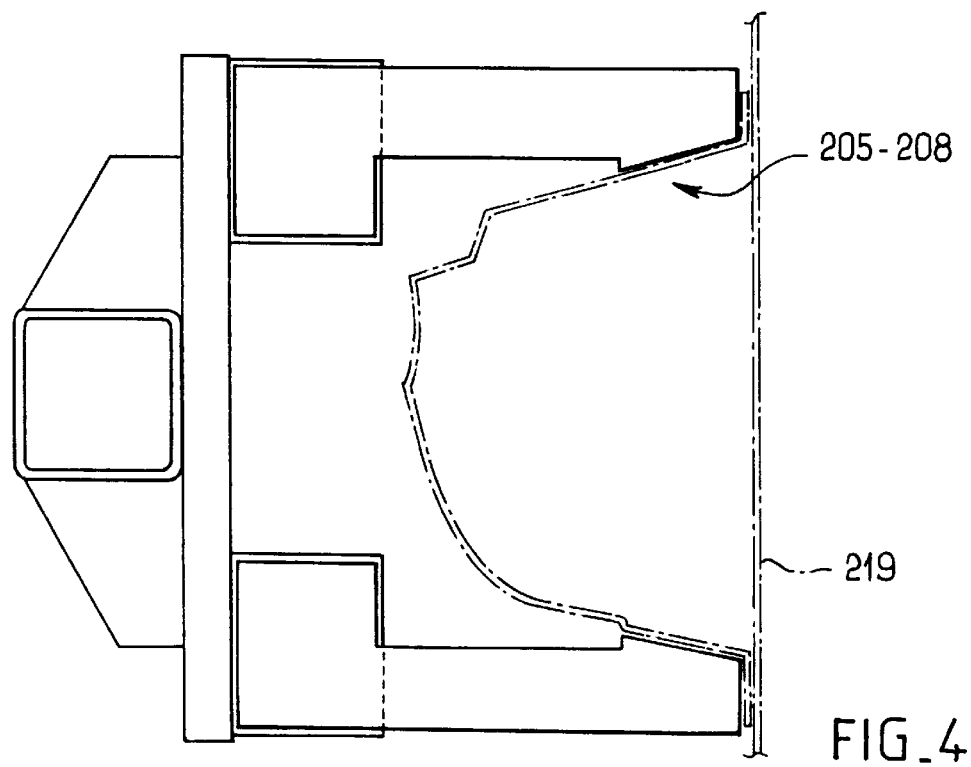
FIG._4

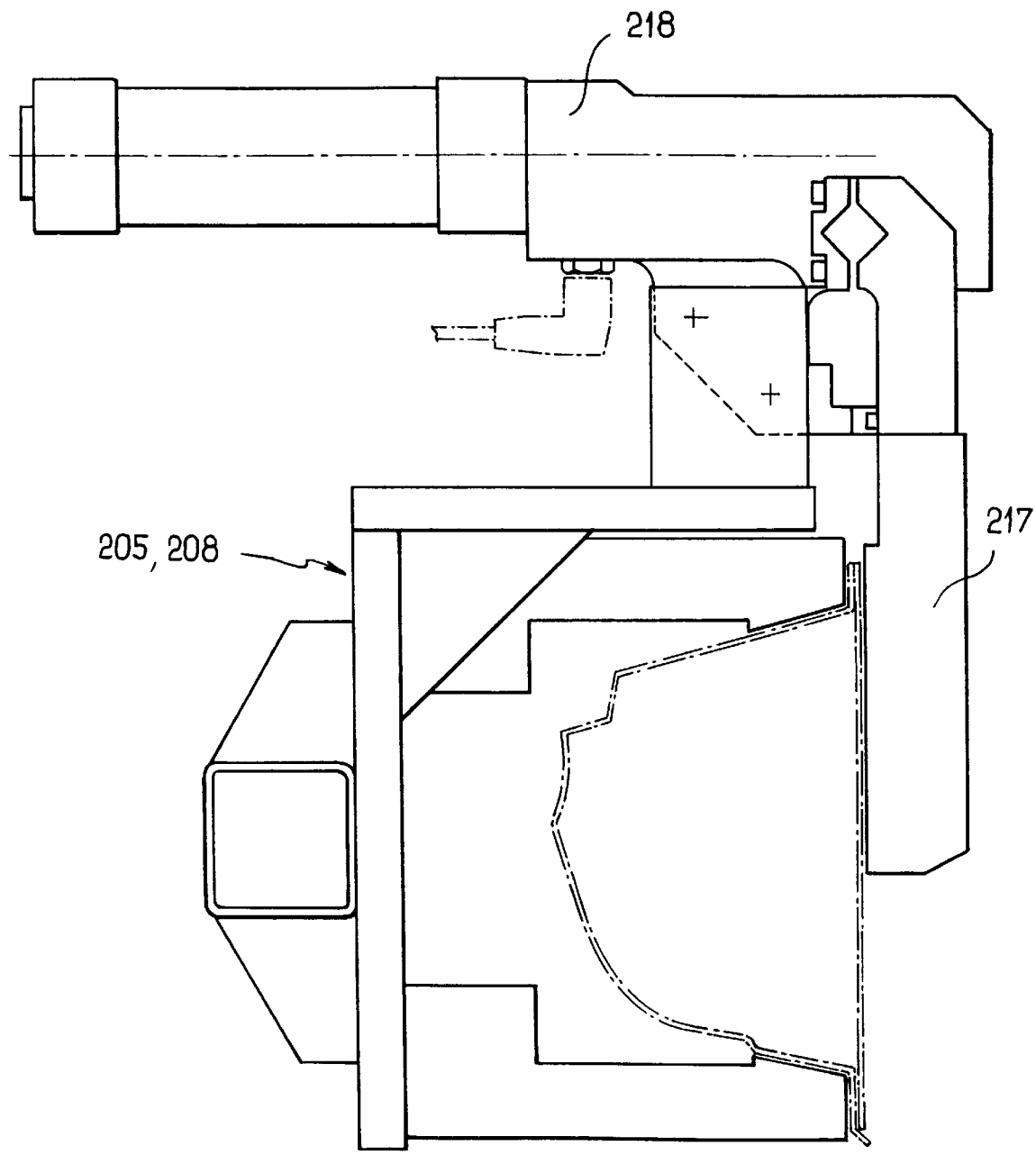
FIG_6

METHOD FOR ASSEMBLING BODYWORK PARTS

The present invention relates to a method for assembling car bodyparts, in particular sheet metal elements, and more particularly it relates to a method for positioning and holding the parts accurately relative to one another, while the set of parts are put into place and held accurately in a fixed frame of reference within which assembly tools (welding robots, fixed or moving mechanical clamps for welding, tools for spreading adhesive or sticking parts together, a laser torch, . . . ) move.

BACKGROUND OF THE INVENTION

In the field of assembling sheet metal parts, and more generally parts of composite material used in car bodyparts, there are presently two main methods of performing such positioning for assembly, in particular by welding.

The first method consists in bringing the parts to be assembled to an assembly station and in holding them relative to one another by means of positioning tools. These tools belong to a station, e.g. along a general assembly line, and their positions are determined in a fixed frame of reference of the station in which the assembly tools also move. Under such circumstances, the machine or assembly line is specific and can accept only one model of an object, e.g. a car bodypart. A substructure of bodyparts is brought to the station by means of a bottom conveyor and is then separated from the conveyor by members for putting the substructure in a reference position in the frame of reference of the station (e.g. abutments, centering fingers, vertical supports, . . . ). Other conveyors bring sides of the body to the station where they are taken over by moving tools for placing the body sides in positions that are determined in a frame of reference of the station, and thus relative to the substructure. Finally, other tools bring the roof, cross-members, and the like in the same way.

Such a single-shape assembly station can build only one shape, with the advantage of exactly reproducing the same shape for each product going through it. This specificity of the machine nevertheless presents the drawback of being incapable of accommodating model changes without major action being taken on the tooling. Also, it is not capable of being adapted to assembling more than one model in a single stream.

Attempts have been made to make such an assembly line more flexible, and they have given rise to a second method which consists in making subassemblies of assembled parts storing them on a pallet (bottom of bodywork, side, front block, . . . ) and then bringing together all of the pallets, required for making the bodywork, to a single station where the subassemblies are moved towards one another into positions determined by apparatus belonging to the positions station. Each pallet is roughly in the form of a frame or a tray having on one face thereof features for positioning and holding the assembled parts, which are permanent and dedicated to the assembled parts, while the other face of the pallet has standard features which are to be found in identical manner on all pallets of the same type (substructure, side of bodywork, etc.). The standard features are designed to co-operate with simple referencing tools belonging to the station. Such a station can thus accept pallets carrying different models since the tools of the station only "see" a single common pallet face regardless of the model. Only computer control relating to paths or trajectories needs to be changed from one model to another, and that can be done very much more quickly than changing the tooling. Positioning is generally performed by locking the pallets to means fixed to the station. Such a technique can be said to be "multi-shape" since even two identical products (the same model of vehicle) are handled by means of distinct pallets which are necessarily different given the dispersions of dimensions between identical parts constituting two pallets. Thus, two same-model products are not necessarily of exactly the same shape, and the resulting manufacture is of poorer quality than is the single-shape type manufacture.

In addition, pallets are extremely heavy and bulky. They require powerful handling tools to be installed that are likewise bulky and that impede access to the station. It is also necessary to have a large number of pallets in order to maintain rotation thereof between upstream assembly lines, where they are fitted with the parts they are to carry, and the general assembly line. As a result this type of installation is expensive and that limits the advantage of using it.

There thus exists an unsatisfied need for an assembly line that assembles bodyparts, that is versatile in use and relatively cheap, while nevertheless conserving the qualities of a single-shape type system.

SUMMARY OF THE INVENTION

The invention enables this need to be satisfied by proposing an assembly method using light weight supports transparent to the handling tools, thereby enabling the handling tools to be interchangeable, and thus providing the manufacturer with greater choice. The supports also carry a portion of the features of the part that is designed to cooperate with the positioning means of the assembly station, thus enabling single-shape type specific stations to be installed with the advantage of their accuracy which is better than that of stations using recyclable pallets, while still making it easy to obtain a degree of standardization concerning the nature and the location of the positioning features carried by the support from one model to another.

More precisely, according to the invention, the method of assembling sheet metal parts, whereby at least two separate elements are brought to an assembly station, then held stationary by positioning tools belonging to the station in a determined relative position and in an overall position that is likewise determined in the frame of reference of the station, and are fixed together, in particular by welding, comprises associating at least one of the elements with a support, which includes means for holding the element, coupling the support to at least one handling device, indexing the support in the frame of reference of the assembly station, bringing the element into the assembly station by means of the support, indexing the element, at least in part, in the assembly station by means of the support, and by actuating the positioning tools so that they co-operate in shared manner both with the element and with the support so as to bring the element into its final position, including, where appropriate, releasing some only of the holding means, and in proceeding to connect the elements together.

It will be understood that this method has the advantage of providing continuity for the successive steps of building an assembly of sheet metal parts. The term "element" is used to mean a unit part and in this case the method is implemented in lines that assemble subassemblies of elements, starting from the first station, with the element being "enriched" with additional elements as it passes through successive stations so as to become a subassembly that continues to be associated with the base support used from the start.

This subassembly which is always associated with its support then reaches the general assembly line and the term "element" should then be understood as representing the subassembly. In this case, each element brought to stations of the general assembly line can be a subassembly itself associated with a support that has been with it all the way through its assembly line upstream from the general assembly line.

The advantage of sharing reference points or marks for geometrical function between the support and the changing subassembly that it carries results from the reference points being put into a hierarchy. For example, certain points of a vehicle body must be located very accurately in three dimensions relative to the three reference axes. However, other points need to be very accurate along only one or two axes and require less accuracy along the third axis. For example, when building the side of a vehicle body, the accuracy required for the cant rails (roof, top of wind-screen, back window) is much greater than in the bottom portion of the side of the body that is to be connected to the floor. It is therefore advantageous to set up the cant rails, the parts which are progressively associated therewith, and in the general assembly, their mutual connection by means of cross-members and the roof, using fixed positioning tools that co-operate directly with those parts, and for this to be done at each stage in the construction of the subassemblies.

In contrast, for the bottom of the side of the body, there is no harm in placing an intermediate part between the subassembly and the positioning tools means of the various stations. It is thus possible to support the assembly on means that are much lighter than a pallet, and this is advantageous for several reasons. Firstly the weight and the bulk of pallet prevent it being used from the beginning, so it becomes necessary in the pallet technique to perform preliminary assembly operations in stations that are external to the pallet, and then to perform special handling operations with the resulting components. Also, a pallet is a screen between the positioning tools in the general assembly line and the product (bodywork), which penalizes accuracy during such positioning. The dimension chain between such tools and the product is therefore necessarily longer, and for given accuracy of the tools in the assembly station, uncertainty in the positioning of the product becomes greater.

The lightweight support of the invention also makes it possible to use handling means that are also light in weight, and therefore compact, thus making access to each station easier for welding machines or other assembly means.

Finally, the support has the advantage of being suitable for storing in a small volume, in particular by being suspended vertically.

According to the invention, the support comprises a structure that is substantially contained between two surfaces, one of which includes means for referenced positioning and holding of the element and the other face of which includes certain means for indexing the support-and-element assembly in the reference system of each station in which it is received. This lightweight structure serves both as a "hand" for holding the elements that are to be assembled together, and as a moving frame of reference in which the elements are accurately referenced.

In this respect, it may be observed that the support references (i.e. means which co-operate with positioning the product) have no need to be strictly and rigidly tied to one another by the support since they are taken in charge by the positioning tools means of each station. This gives rise to an important advantage of the invention, namely that the support structure can accommodate a certain amount of elastic deformation, so it can be built as a lightweight frame whose deformation (providing naturally that it remains within acceptable limits) has no influence on the positioning of the product since any such deformation is "corrected" at each station served by the support. In the description below, the support is also referred to as a "cassette".

Other characteristics and advantages appear from the following description of the invention in the context of a particular application.

BRIEF DESCRIPTION OF THE DRAWINGS

Reference is made to the accompanying drawings, in which:

FIGS. 3, 4, 5, and 6 are sections respectively on lines III—III, IV—IV, V—V, and VI—VI of FIG. 2 showing the referencing and holding means included in the cassette of the invention.

DESCRIPTION OF A PREFERRED EMBODIMENT

Figure 1:
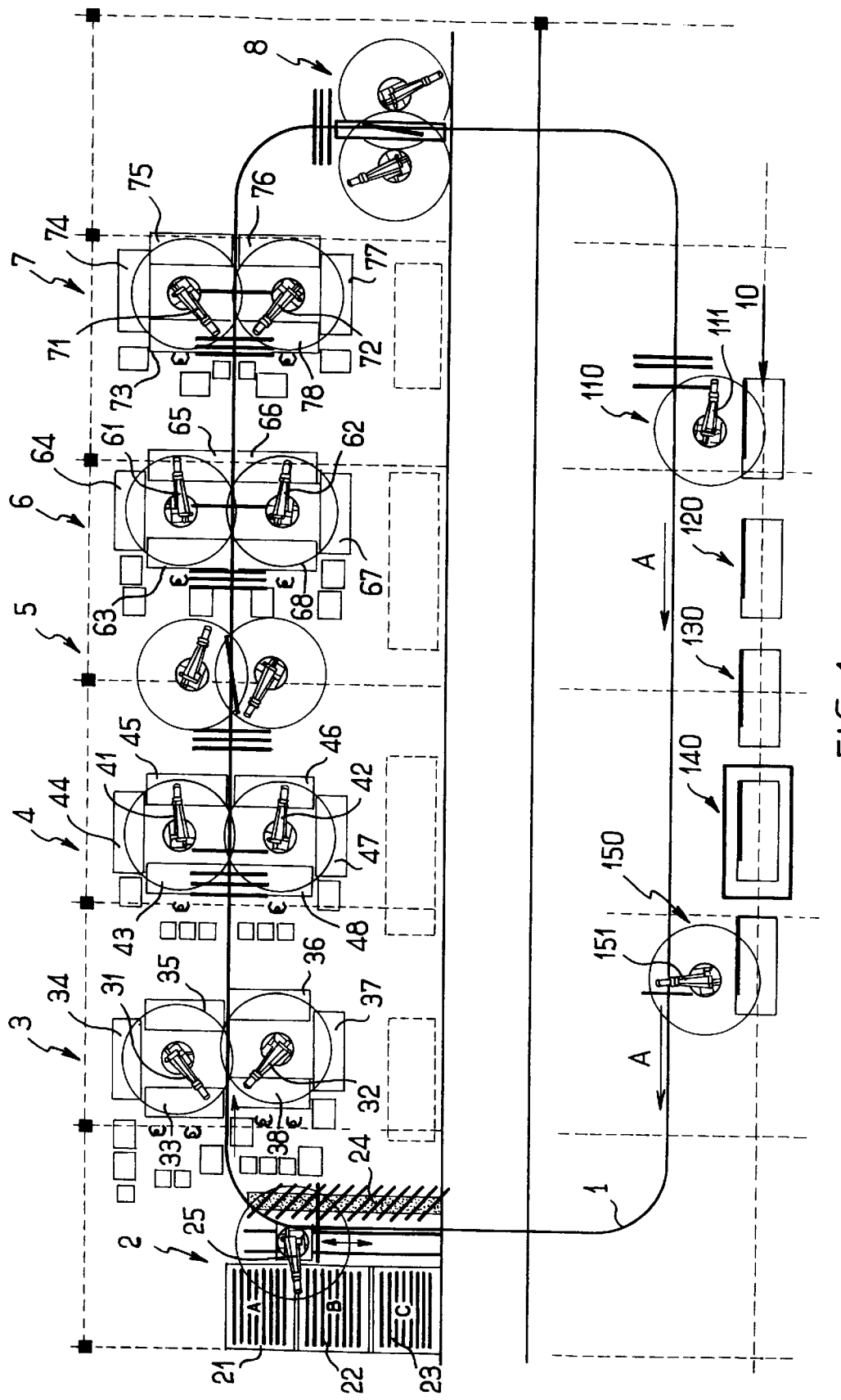
FIG. 1 is a plan view of a line for building a bodywork subassembly, e.g. a side of a body; and co-operating with a general assembly line.

FIG. 1 shows a looped general transporter 1 that circulates in the direction of arrows A, both through seven stations 2 to 8 of a line for building a vehicle bodywork subassembly, e.g. a body side, and also along a general assembly line 10 in which, by means of several stations, the body side is united with other subassemblies for the bodywork of a motor vehicle.

It is assumed that the line through which the general handling device 1 passes is designed for building three different models of body side: A, B, and C. The station 2 thus has three magazines 21, 22, and 23 for the first body side part which is generally a skin part. It also includes a rack 24 which contains cassettes for each of the three models of body side to be built, with one example thereof being shown in FIG. 2. A handling member 25 shown here in the form of a robot serves firstly to load and unload the general handling device 1 and secondly to associate each of the cassettes 201 (See FIG. 2) with the corresponding skin part of model A, B, or C, using the cassette as a "hand" for holding the part that is to be taken and extracted from one of the magazines 21, 22, and 23.

The cassette fitted in this way with the first part, and relative to which said first part is referenced specifically by using means that are described in detail with reference to the following figures is transported to station 3. Unloaded from the general handling line 1 by means of one or other of the handling robots 31 and 32, the cassette is placed in one of the stations 33 to 38 depending on the model to which it relates, and in which station the skin carried by the cassette is enriched with additional elements. Each of the stations 33 to 38 is an assembly station which therefore has references for receiving the assembly comprising the cassette plus the skin part and for holding the elements that are to be added to the skin part. Some of the references in each of these stations co-operate with the cassette while the others co-operate with the skin part carried by the cassette. The references in each station thus share co-operation both with the part and with the cassette, and this is important since it makes it possible to distinguish between references that must be accurate for making small tolerance assemblies and references that are less accurate. Where assembly tolerances need to be small—using references that are referred to as "main" references for the station in question—, it is advantageous to establish direct contact between the parts to be assembled together and the positioning tools so as to minimize dimension chains since their length governs accuracy, whereas for the other references, referred to below as "additional" references, the presence of an intermediate part between the product and the references of the assembly station remains compatible with the tolerances laid down.

By means of this distinction, it is possible in each of the stations of stand 3 to reference the cassette-and-product assembly without any need to separate the cassette from the product, insofar as the cassette cooperates with products in zones where positioning accuracy is of smaller importance.

The manipulators 31 and 32 co-operate solely with the cassette associated with the product to load and unload the handling line 1 and to install the cassette-and-product assembly in the appropriate stations of the stand 3. When work in stand 3 has been completed, the cassette is taken to the next stand 4 by the general handling line 1 and there, as in the preceding station, manipulators 41 and 42 provide handling between the line 1 and the various stations 43 to 48 of the stand.

Stand 5 is a finishing stand in which no setting-up operation is performed. In this type of stand, additional welding and sticking is performed, and intermediate fixing means are put into place, with that requiring use only of the part secured to the support. For example, in some operations, without separating the part from the general handling means, it can suffice to put the part into abutment (jogging) to position it in the frame of reference in which the robot moves for welding or for placing a fillet of adhesive. For other operations, the subassembly carried by the cassette is taken charge of by a handling robot which brings it directly between the jaws of a welding clamp that is fixed to the ground, for example.

Stands 6 and 7 are similar to stands 3 and 4 in all respects and serve to enrich the body side subassembly with all the elements that it requires, and to this end these stands possess manipulators 61, 62, 71, 72 and assembly stations 63 to 68 and 73 to 78.

The station 8 is a finishing and final inspection station prior to the cassette, fitted with the finished body side subassembly, is placed onto the general assembly line 10.

In the first station 110 of this general assembly line, a manipulator 111 serves to put each of the cassettes fitted with a body side along a body substructure, for example. It should be assumed that a similar installation is on the other side of the general assembly line for putting the other side of the body in place. Each station 120, 130, and 140 of the general assembly line is, for example, dedicated to assembling one of the three models of vehicle constituting the manufacturing stream on this general assembly line. Other dispositions could be adopted, for example there could be a single station and the positioning tooling of the single station could be altered as a function of the model to be made at that station. Naturally, which of these various solutions is selected depends essentially on the similarity or difference between the models which are to be accepted on the general assembly line.

At station 150, a manipulator 151 serves to recover each of the cassettes, since the body side has by then been welded to the remainder of the vehicle structure. The cassette is returned by handling line 1 to station 2 either to be stored in the rack 24 or else to be reused immediately if the current demand for body sides corresponds to the model it is capable of accommodating.

Figure 2:
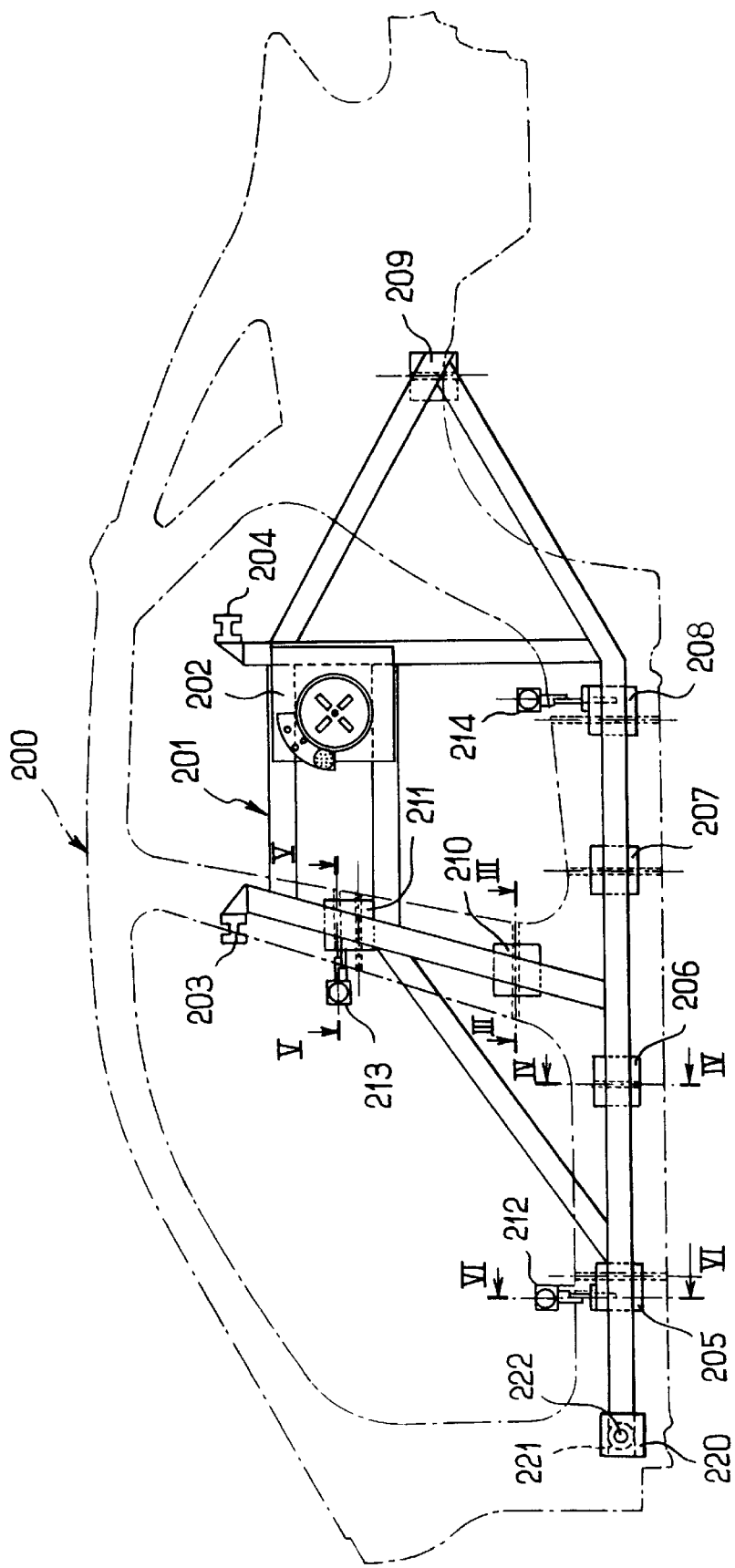
FIG. 2 is an elevation view of a cassette of the invention adapted to transporting and positioning a vehicle body side.

In FIG. 2, the body sides shown in chain-dotted lines, is given reference 200. It essentially comprises a piece of sheet metal or an assembly of cutout and stamped pieces of sheet metal having one face, the face visible in the figure, that constitutes, at least in part, the skin of the vehicle, while the opposite face of the sheet metal is fitted with various parts and accessories serving both to enable it to be assembled with other bodywork parts and also for connection with, or for receiving, elements such as internal linings, door hinges, lock catches, etc. On its skin side, the body side 200 is fitted with a cassette 201. The cassette is a relatively lightweight structure with open spaces extending between two parallel surfaces which are also substantially parallel to the skin surface of the body side. On its outside surface, i.e. the surface visible in FIG. 2, the cassette 201 has a certain number of zones 202, 203, and 204 fitted with means for engaging and connecting the cassette to a handling device. Thus, zone 202 comprises a sort of plate that can be docked to the end of the arm of a manipulator such as 25, 31, 41, . . . and to which the manipulator can be locked. In addition, the zone 202 may carry information enabling the manipulator to recognize the type of cassette with which it is docking and of which it is taking charge to enable it to direct the cassette properly to the appropriate station for receiving it in each of the stands 2 to 8.

Located near the top of the cassette, the zones 203 and 204 merely comprise pins enabling the cassette to be suspended, e.g. from an overhead conveyor that may constitute the general handling line 1.

The general shape of the cassette 201 is naturally determined by the general shape of the subassembly it is to carry and also by those zones of the subassembly which, both in the various stations where the subassembly is built up and in the general assembly station, are to constitute references that need to be located accurately, i.e. that must come directly into contact with positioning tools. Thus, in the example of FIG. 2, eight reference zones are used. These are bottom zones 205, 206, 207, and 208 located facing the sill of the body side, the zone 209 facing the top portion of the back wheel arch, zones 210 and 211 facing the center pillar of the body side, and zone 220 facing the front portion of the body side. In these zones, the outside face of the cassettes has respective plates that constitute determined reference surfaces for co-operating with referencing tools on standby or activated, both in the various stations of the stands 3, 4, 6, and 7, and in the general assembly line.

On the other face, and in these zones 205 to 211 and 220, the cassette also has referenced surfaces for receiving the body side 200 and for holding it in shape, since it is relatively deformable given that it essentially comprises stamped sheet metal. Thus, FIG. 3 shows the zone 210 of the cassette with its plate 210a and two arms 210b and 210c which are adapted firstly to comply with the shape of the center pillar and secondly to present end surfaces 210d and 210e against which said center pillar bears, said end surfaces being accurately defined relative to the outside surface of the plate 210a.

The zones 205 to 208 which co-operate with the sill projecting from the body side are entirely similar in structure.

In the zone 209, and as in the other zones, the body side is pressed against a surface that performs the same function as the surfaces 210d and 210e of FIG. 3, and it is also vertically supported by a bracket passing through the top of the wheel arch. This disposition is not shown since it is possible to imagine different ways of indexing the body side to the cassette. In the present case, it can be seen that for the zones 205 to 208, 210, and 211 the only accurate reference is that taken in a direction perpendicular to the figure. As for the zone 209, the reference has two components, the same as the preceding components plus a vertical component since it has a support surface in the wheel arch. In the zone 220, the means for indexing the body side on the cassette are constituted by a centering cylinder or "pilot" 221 received in an orifice of the bodywork (on the side of the cassette that faces the body side) and which has a bore 222 itself capable of receiving a pilot of a stand in the subassembly line and of a station in the general assembly line. In this respect, it should be observed that this disposition is advantageous in that it protects the orifice in the body side which would otherwise have had to receive a pilot in each stand, which would have caused the orifice to become enlarged and oval, thereby destroying the accuracy of the reference.

Figure 5:
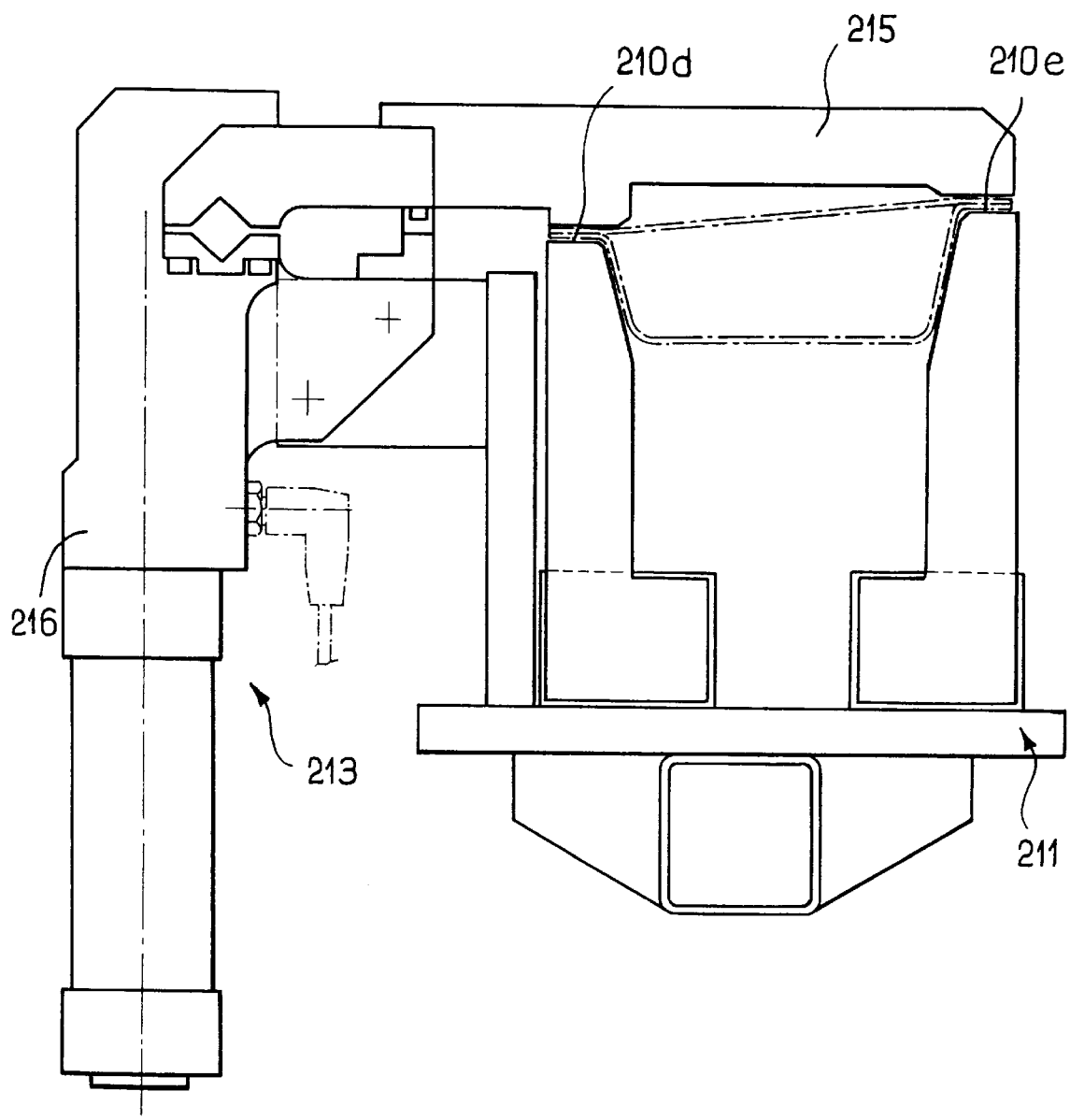

On its face opposite to the face visible in FIG. 2, the cassette also includes means for holding the body side against the cassette, preferably without clamping it, and in particular against the reference surfaces of the cassette. These means are illustrated in FIGS. 5 and 6, and in FIG. 2 they are given the references 212, 213, and 214. In the vicinity of the zone 211 (being offset above said zone, for example, so as to leave access thereto free), the means 213 comprises a jaw 215 that is movable relative to the surfaces 210d and 210e for bearing against the center pillar of the bodywork, the jaw 215 being coupled to an actuator 216 for moving it towards or away from the plane of the surfaces 210d and 210e, movement of the jaw optionally being accompanied with rotation about the axis of the actuator 216, for example, in order to disengage the center pillar completely from the cassette.

At the zones 205 and 208 of the cassette, the fixing means 212 and 214 are of the same type as the fixing means 213 described above, i.e. they comprise a jaw 217 and an actuator 218, the jaw 217 holding the sill against support surfaces identical to the support surfaces 210d and 210e at the zones 205 and 208, but without clamping it.

It may be observed that the entire cassette lies inside the outline of the body side with which it is associated so that large zones of the body side remain cantilevered out and fully accessible for the positioning means of a station whether in the manufacturing line or in the general assembly line. In the particular case shown in the figures, the cantilevered zones are constituted by the cant rails 220 of the body side, i.e. its top zones for connecting to the roof and to the front and back cross-members. It is in this zone that the positioning accuracy of the bodywork must be greatest in order to avoid errors of squareness and defects in the appearance of the bodywork. At the bottom, the bodywork side is connected by the bottom panel to the substructure or floor of the vehicle. This connection which consists in pressing the sill against the top sides 219 of the substructure has no need for great accuracy, particularly in the vertical direction, i.e. perpendicularly to the floor. Docking is performed between these bodywork elements with the possibility of sliding. At this location it is thus quite possible to perform positioning of the bodywork in the general assembly line via the cassette 201 since it provides an accurate reference in a direction perpendicular to FIG. 2, and that is the main requirement for this connection between the floor and the body side.

Finally, it is mentioned that the cassette 201 has another plate on its surface fitted with references that are in contact with the body side and level with the plate 202 for enabling the cassette to be grasped by a robot, which other plate may be accessible through the back door opening that is to be found at this location in the body side. This plate has coupling means that are identical to those of the plate 202 for the arm of a robot. This disposition is entirely advantageous since it enables the subassembly carried by the cassette to be turned about merely by selecting which side of the cassette to grasp, thus making it possible to place the assembly in a station either in a convex configuration, i.e. with the skin towards the outside of the station, or else in a concave configuration, i.e. with the skin towards the references of the station. This possibility of turning the assembly about is advantageous since it makes it possible to simplify certain operations concerned with installing and welding accessories that are to be fitted to the body side.

In the example described above, the zones 205 to 211 which form the reference interface between the cassette and certain positioning means of the assembly stations are constituted in this case merely by abutment surfaces. The scope of the invention extends to providing other positioning or indexing means in these zones as in the zone 220, which may be constituted by pilots, i.e. fingers that co-operate with bores, or by bezels, or merely by abutments that need to be brought to bear in planes other than that of FIG. 2. In addition, and in particular in the general assembly station for assembling the body side to the remainder of the vehicle, at least some of the means 212, 213, 214 for coupling the body side to the cassette may be released during final setting up. The tools for positioning the bodywork relative to the cant rails 220 need the body side to have certain amount of freedom relative to the floor in order to be able to adjust the positions of the cant rails to match those of the roof, the cross-members, or the opposite body side. Under such circumstances, the jaws 217 of the means 212 and 214, which hold the bottom panel against the cassette, are opened.

The above description relating to a body side is easily extrapolated to any car bodywork subassembly.

Finally, an important advantage of the invention can be mentioned, namely the possibility of removing the subassembly and the cassette from the general line at any stage during subassembly building for the purpose of inspection or of adding one or more additional operations. It is thus possible, at least in subassembly manufacturing lines, to have a high degree of flexibility enabling them to be adapted to different types of parts that are to be built, thus making it possible to introduce new products on an existing production line.

What is claimed is:

1. In a line for assembling bodywork parts having a plurality of assembly stations In each of which at least two separate parts are brought together, are held stationary by positioning means belonging to each said station in an accurate absolute position with respect to a fixed frame of reference of said station, and are joined together, a method comprising:

a) combining one of the parts with a support by gripping said one part to the support with gripping means belonging to the support, b) transporting the support and said one part as a unit to an assembly station, c) transporting the other part to the assembly station, d) actuating said positioning means so that the positioning means act directly with said one part, with the support, and with said other part to complete a positioning of the said parts in the assembly station, e) proceeding to join said one part with said other part, and f) deactuating said positioning means, removing the joined parts with said support as a unit from said assembly station and transporting said unit to a next assembly station.

2. The method of claim 1 further comprising releasing some of said gripping means when actuating said positioning means.

3. The method of claim 2 further comprising re-engaging said gripping means when deactuating said positioning means before removing and transporting said unit.

4. The method of claim 1 further comprising placing a plurality of stations in each of a plurality of successive stands along the line, with the number of stations in each stand being equal to the number of different subassemblies.

5. The method of claim 1 in which the combining of the support with the one part is performed before transporting said unit to a first assembly station.

6. The method of claim 1 further comprising, after a last assembly station, transporting said unit to a first in successive stations in said line.

7. The method of claim 6 further comprising, at the last station, releasing said gripping means and transporting the support from said last station to a waiting station at a head of said line.

8. The method of claim 1 wherein transporting said unit from one station to another is performed by coupling the support to a transport device.

* * * * *

UNITED STATES PATENT AND TRADEMARK OFFICE
CERTIFICATE OF CORRECTION

PATENT NO. : 6,065,200
DATED : May 23, 2000
INVENTOR(S): Bernard NEGRE

It is certified that error appears in the above-identified patent and that said Letters Patent are hereby corrected as shown below:

In category "[86], please make the following corrections to the dates:
-- § 371 Date: Apr. 29, 1996
   § 102(e) Date: Apr. 29, 1996 --

Signed and Sealed this

Twenty-second Day of May, 2001

Attest:

NICHOLAS P. GODICI

*Attesting Officer*   *Acting Director of the United States Patent and Trademark Office*